United States Patent
Sun

(10) Patent No.: US 8,841,861 B2
(45) Date of Patent: Sep. 23, 2014

(54) DIMMING DEVICE

(75) Inventor: Tai-Ping Sun, Jhongli (TW)

(73) Assignee: National Chi Nan University, Puli, Nantou (TW)

( * ) Notice: Subject to any disclaimer, the term of this patent is extended or adjusted under 35 U.S.C. 154(b) by 217 days.

(21) Appl. No.: 13/547,154

(22) Filed: Jul. 12, 2012

(65) Prior Publication Data

US 2013/0106308 A1    May 2, 2013

(30) Foreign Application Priority Data

Oct. 28, 2011   (TW) .............................. 100139372 A

(51) Int. Cl.
   *H05B 37/02*    (2006.01)
   *H05B 33/08*    (2006.01)
(52) U.S. Cl.
   CPC ............. *H05B 33/086* (2013.01); *Y02B 20/347* (2013.01); *H05B 33/0818* (2013.01)
   USPC ............................. 315/297; 315/307; 315/360
(58) Field of Classification Search
   USPC ......... 315/246, 250, 247, 291, 297, 307, 308, 315/312, 360
   See application file for complete search history.

(56) References Cited

U.S. PATENT DOCUMENTS

| | | | |
|---|---|---|---|
| 8,587,212 B2 * | 11/2013 | Li et al. ........................ | 315/250 |
| 2009/0302781 A1 * | 12/2009 | Peker et al. ................... | 315/297 |
| 2011/0006705 A1 * | 1/2011 | Liu et al. ....................... | 315/307 |
| 2012/0019155 A1 * | 1/2012 | Chen et al. .................... | 315/186 |

FOREIGN PATENT DOCUMENTS

TW           200924564 A      11/1996

OTHER PUBLICATIONS

Search Report for Taiwanese Counterpart Application No. 100139372 Issued Dec. 24, 2013 and English translation.

* cited by examiner

*Primary Examiner* — Tung X Le
(74) *Attorney, Agent, or Firm* — Shook, Hardy & Bacon LLP

(57) ABSTRACT

A dimming device includes: a constant current generator for generating a current to a main LED unit; a state generator for generating a state counting output having a counting value that is equal to one of continuous values respectively associated with different light-mixing states of a secondary LED unit; and an RGB modulation circuit operable to generate, based on the state counting output, multiple PWM signals with the same PWM cycle for driving respectively R, G, and B LEDs of the secondary LED unit such that the secondary LED unit is sequentially operated in the light-mixing states. The secondary LED unit emits a mixed light with an individual color in each of the different light-mixing states to compensate lighting of the main LED unit.

17 Claims, 8 Drawing Sheets

DIMMING DEVICE

CROSS-REFERENCE TO RELATED APPLICATION

This application claims priority to Taiwanese Application No. 100139372, filed on Oct. 28, 2011.

BACKGROUND OF THE INVENTION

1. Field of the Invention

The invention relates to a dimming device, and more particularly to a dimming device for adjusting color temperature and color rendition index (CRI).

2. Description of the Related Art

Dimming methods for a light emitting diode (LED) include an analog dimming method and a digital dimming method.

According to the analog dimming method, a voltage across the LED is adjusted to non-linearly raise or reduce a current flowing through the LED such that the brightness of the LED is adjusted to achieve different lighting effects. However, since variation of an amount of the current may result in the wavelength drift of light emitted from the LED, color temperature cannot be exactly controlled.

According to the digital dimming method, for example a pulse width modulation (PWM) dimming method, the LED is driven by a PWM signal with a fixed amplitude and various duty cycles. In other words, the brightness of the LED is adjusted by controlling a ratio of on-off time of the LED, i.e., the duty ratio of the LED, in response to the PWM signal. In this case, due to the persistence of vision, light emitted from the LED has a relatively stable wavelength, thereby facilitating control of color temperature as compared to the analog dimming method. However, for a white light LED formed by means of a blue light LED coated with a yellow phosphor, although such a white light LED is driven by a PWM signal, desired color temperature may not be achieved.

SUMMARY OF THE INVENTION

Therefore, an object of the present invention is to provide a dimming device that can overcome the aforesaid drawbacks of the prior art.

According to one aspect of the present invention, there is provided a dimming device for a lighting device including a main light emitting unit and a secondary light emitting unit. The secondary light emitting unit includes at least red-light-emitting element, at least one green-light-emitting element and at least one blue-light-emitting element. The dimming device of the present invention comprises:

a constant current generator adapted for outputting a current with a fixed amplitude to the main light emitting unit;

a state generator operable to repeatedly count based on an input frequency signal so as to generate a state counting output having a counting value that is equal to one of a plurality of continuous counting values and that changes from a current one of the continuous values to a next one of the continuous values after a time period associated with the input frequency signal, the values being respectively associated with a plurality of different light-mixing states of the secondary light emitting unit; and an RGB modulation circuit connected electrically to the state generator for receiving the state counting output therefrom, and operable to generate, based on the state counting output from the state generator, a plurality of periodic pulse width modulation (PWM) signals with the same PWM cycle, each of the PWM signals being adapted to drive a corresponding one of the red-light-emitting, green-light-emitting and blue-light-emitting elements of the secondary light emitting unit such that the secondary light-emitting unit is sequentially operated in the different light-mixing states.

The secondary light-emitting unit emits a mixed light with an individual color in each of the different light-mixing states to compensate lighting of the main light emitting unit.

According to another aspect of the present invention, there is provided a dimming device for a light emitting unit. The dimming device of the present invention comprises:

a pulse-width modulation (PWM) signal generator for generating a plurality of periodic pulse width modulation (PWM) singles with the same PWM cycle; and an off-pulse generator connected electrically to the PWM signal generator for generating a periodic off-pulse signal based on an external dimming control input, and outputting the off-pulse signal to the PWM signal generator, the off-pulse signal having a frequency higher than that of the PWM signals, and a pulse width determined by the external dimming control input.

The PWM signal generator further adjusts the duty cycle of each of the PWM signals based on the off-pulse signal from the off-pulse generator, and then outputs the PWM signals adjusted thereby to the light emitting unit to drive the light emitting unit to emit light.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
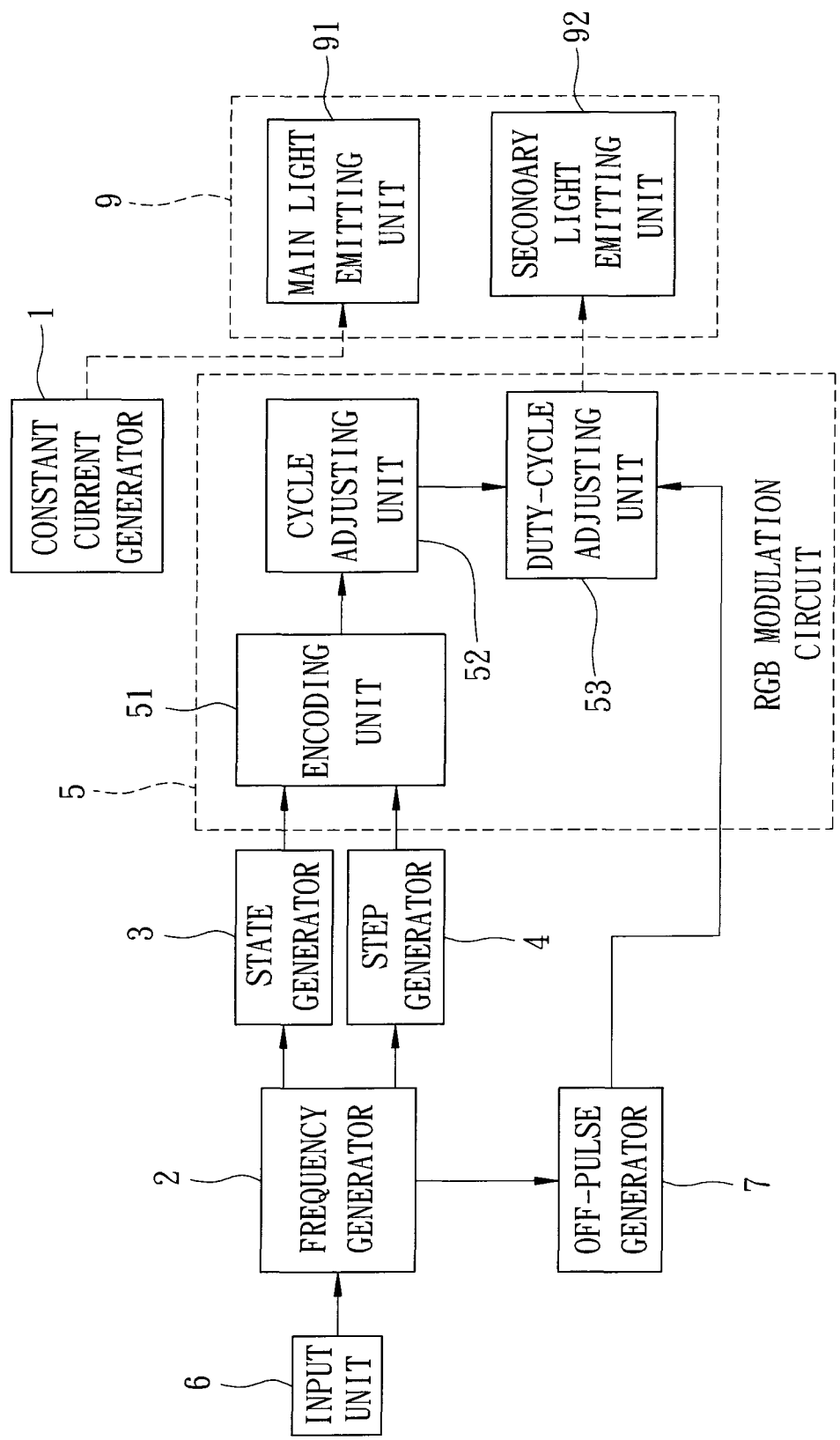
FIG. 1 is a schematic circuit block diagram illustrating the preferred embodiment of a dimming device according to the present invention.

Referring to FIG. 1, the preferred embodiment of a dimming device for a lighting device 9 according to the present invention is shown to include a constant current generator 1, a frequency generator 2, a state generator 3, a step generator 4, an RGB modulation circuit 5, an input unit 6, and an OFF-pulse generator 7. The lighting device 9 includes a main light emitting unit 91, and a secondary light emitting unit 92. In this embodiment, the main light emitting unit 91 includes a white light LED (not shown), which is formed by means of a blue light LED coated with a yellow phosphor. The secondary light emitting unit 92 includes a red-light-emitting element, such as a red light LED 921, a green-light-emitting element, such as a green light LED 922, and a blue-light-emitting element, such as a blue light LED 923 (see FIG. 6). In other embodiments, the secondary light emitting unit 92 can merely include a red light LED and a green light LED. The dimming device is adapted to drive the main light emitting unit 91 by a driving signal from the constant current generator 1, and drive the secondary light emitting unit 92 by a plurality of periodic pulse-width modulation (PWM) signals with the same PWM cycle that are to be generated by a PWM signal generator consisting of the frequency generator 2, the state generator 3, the step generator 4 and the RGB modulation circuit 5. It is noted that, in this embodiment, the PWM signals are applied to cathodes of the red, green and blue light LEDs 921, 922, 923 of the secondary light emitting unit 92 (see FIG. 6). As a result, when any one of the PWM signals has a low level, a corresponding one of the red, green and blue light LEDs 921, 922, 923 conducts. When any one of the PWM signal has a high level, a corresponding one of the red, green and blue light LEDs 921, 922, 923 does not conduct. In this case, the high level serves as a non-conduction level, and the low level serves as a conduction level. As such, each of the red, green and blue light LEDs 921, 922, 923 is activated to emit light during the conduction level of a corresponding PWM signal, and is deactivated to cease to emit light during the non-conduction level of the corresponding PWM signal.

Figure 2:
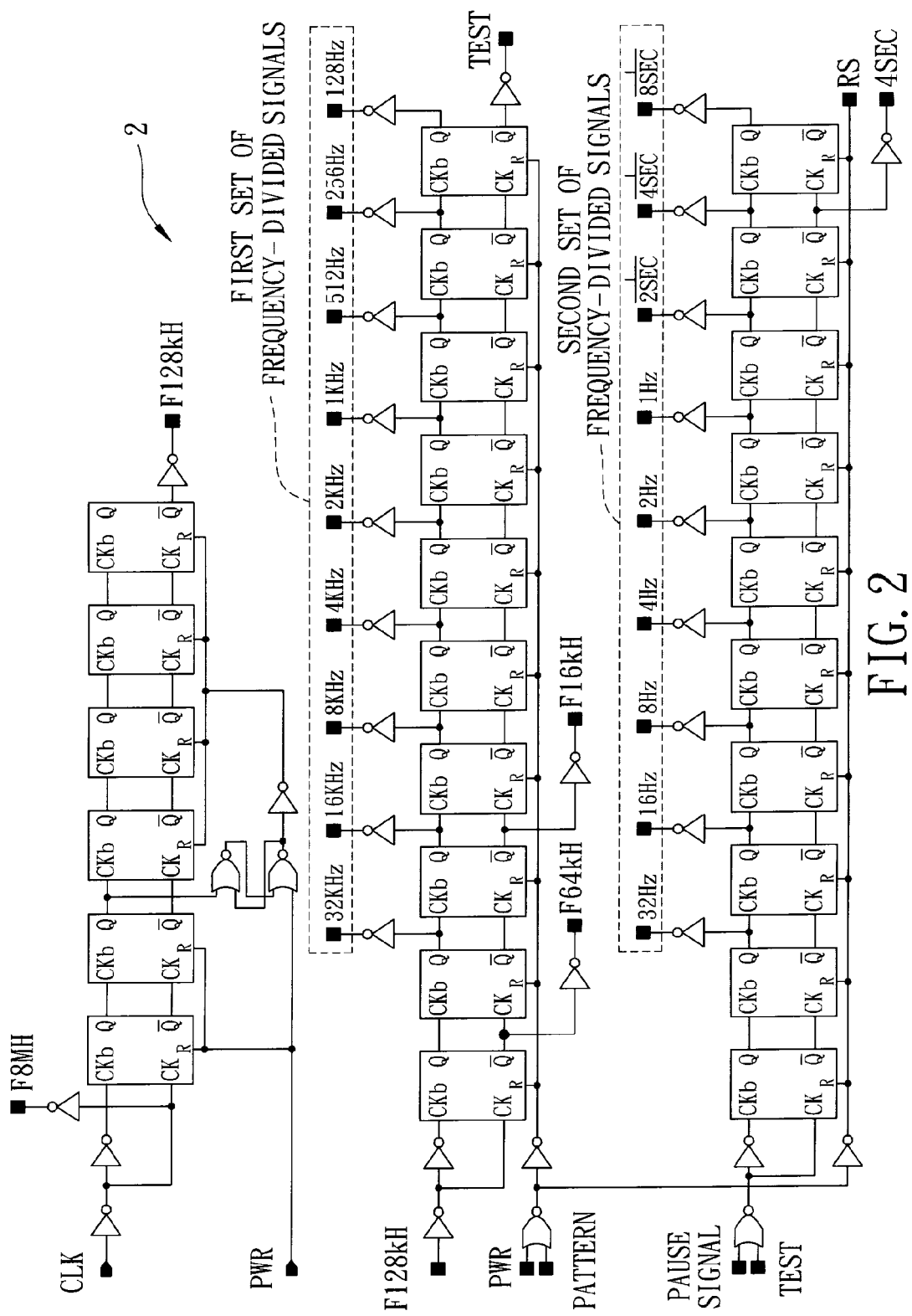
FIG. 2 is a schematic electrical circuit diagram illustrating a frequency generator of the preferred embodiment.

The constant current generator 1 is adapted to be connected electrically to the main light emitting unit 91 for outputting a current with a fixed amplitude to the main light emitting unit 91 such that the main light emitting unit 91 emits light in response to the current from the constant current generator 1. In this embodiment, the current serves as the driving signal Referring further to FIG. 2 the frequency generator 2 is configured to generate a first set of frequency-divided signals and a second set of frequency-divided signals based on a clock input (CLK) that is generated by an oscillator (not shown). In this embodiment, the frequency generator 2 includes a ripple counter consisting of a plurality of D-type flip flops. The clock input (CLK) has a frequency of 8 MHz. Frequencies of the first set of frequency-divided signals have 32 KHz, 16 KHz, 8 KHz, 4 KHz, 2 KHz, 512 Hz, 256 Hz and 128 Hz, respectively. Frequencies of the second set of frequency-divided signals have 32 Hz, 16 Hz, 8 Hz, 4 Hz, 2 Hz, 1 Hz, ½ Hz, ¼ Hz and ⅛ Hz, respectively. In addition, the frequency generator 2 is further operable to hold the second set of frequency-divided signals upon receipt of a pause signal.

Figure 3:
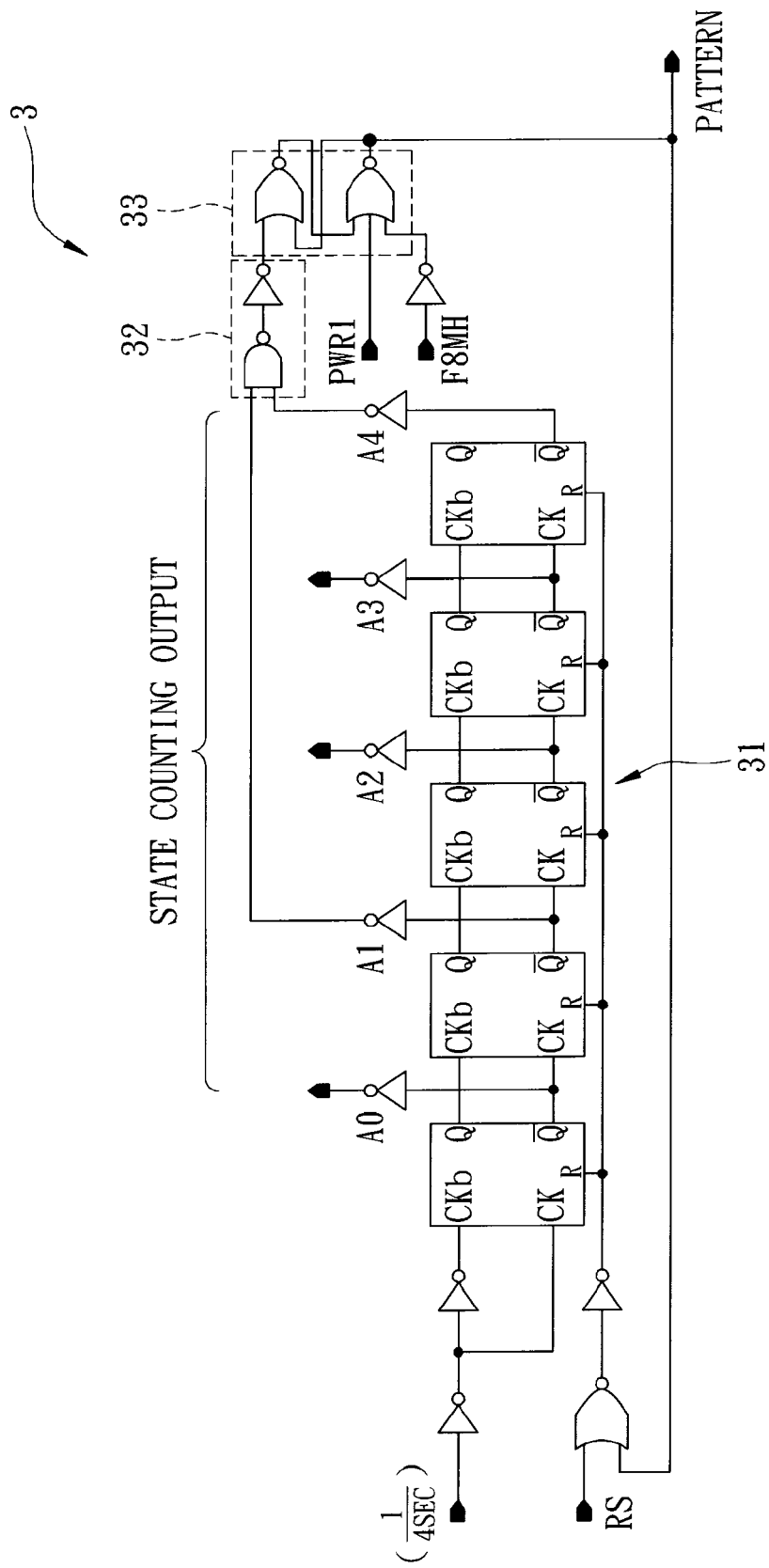
FIG. 3 is a schematic electrical circuit diagram illustrating a state generator of the preferred embodiment.

The state generator 3 is connected electrically to the frequency generator 2. The state generator 3 is configured to repeatedly count based on an input frequency signal so as to generate a state counting output having a counting value that is equal to one of a plurality of continuous counting values and that changes from a current one of the continuous values to a next one of the continuous values after a time period associated with the input frequency signal. In this embodiment, referring further to FIG. 3, the state generator 3 includes a ripple counter 31 consisting of five T-type flip flops, a decoder 32, and an S-R latch 33. The input frequency signal is the frequency-divided signal of ¼ Hz from the frequency generator 2. Thus, the time period is a period of 4 seconds. The state counting output is a five-bit output (A0A1A2A3A4). In addition, the continuous values are 0, 1, . . . , and 17. Thus, the continuous values of 0, 1, . . . , and 17 are respectively associated with 18 different light-mixing states of the secondary light emitting unit 92. It is noted that, when the second set of frequency-divided signals are held in response to the pause signal, the state generator 3 ceases to count to thereby unchange the counting value. The relationships between the counting value of the state counting output and the light-mixing states of the secondary light emitting unit 92 are shown in the following Table 1:

TABLE 1

| state counting output A0A1A2A3A4 | counting value | duty cycle (%) for red right LED | duty cycle (%) for green right LED | duty cycle (%) for blue right LED |
| --- | --- | --- | --- | --- |
| 00000 | 0 | 100 | 0 | 0 |
| 00001 | 1 | 100 | 25 | 0 |
| 00010 | 2 | 100 | 75 | 0 |
| 00011 | 3 | 100 | 100 | 0 |
| 00100 | 4 | 75 | 100 | 0 |
| 00101 | 5 | 25 | 100 | 0 |
| 00110 | 6 | 0 | 100 | 0 |
| 00111 | 7 | 0 | 100 | 25 |
| 01000 | 8 | 0 | 100 | 75 |
| 01001 | 9 | 0 | 75 | 100 |
| 01010 | 10 | 0 | 25 | 100 |
| 01011 | 11 | 0 | 0 | 100 |
| 01100 | 12 | 25 | 0 | 100 |
| 01101 | 13 | 75 | 0 | 100 |
| 01110 | 14 | 100 | 0 | 100 |
| 01111 | 15 | 100 | 0 | 75 |
| 10000 | 16 | 100 | 0 | 25 |
| 10001 | 17 | 100 | 0 | 0 |

As may be seen from Table 1 when the counting value of the state counting output changes from 0 to 3, the duty cycles of corresponding PWM signals for respectively driving the red and blue light LEDs 921, 923 remain to be 100% and 0, respectively, and the duty cycle a corresponding PWM signal for driving the green light LED 922 changes from 0% to 100%. When the counting value state of the counting output changes from 4 to 8, the duty cycle of the corresponding PWM signal for driving the red light LED 921 changes from 75% to 0%, the duty cycle of the corresponding PWM signal for driving the green light LED 922 remains to be 100%, and the duty cycle of the corresponding PWM signal for driving the blue light LED 923 changes from 0% to 75%. When the counting value changes from 9 to 14, the duty cycle of the corresponding PWM signal for driving the red light LED 921 changes from 0% to 100%, the duty cycle of the corresponding PWM signal for driving the green light LED 922 changes from 75% to 0%, and the duty cycle of the corresponding PWM signal for driving the blue light LED 923 remain to be 100%. When the counting value of the state counting output changes from 15 to 17, the duty cycles of the corresponding PWM signals for respectively driving the red and green light LEDs 921, 922 remain to be 100% and 0, respectively, and the duty cycle of the corresponding PWM signal for driving the blue light LED 923 changes from 75% to 0%.

Figure 4:
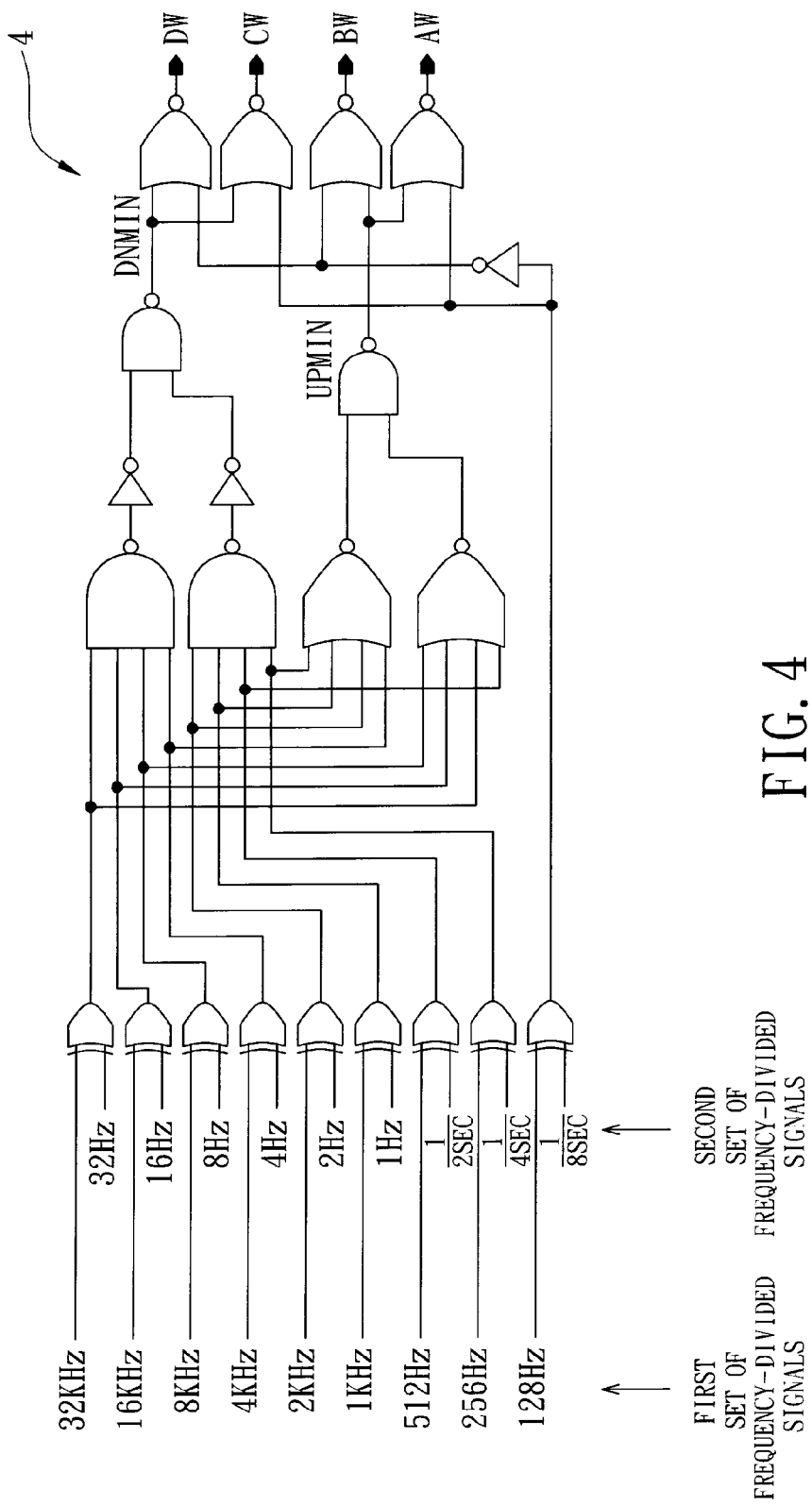
FIG. 4 is a schematic electrical circuit diagram illustrating a step generator of the preferred embodiment.

Referring further to FIG. 4, the step generator 4 is connected electrically to the frequency generator 2. The step generator 4 is configured to generate a step output based on the first set of frequency-divided signals and the second set of the frequency-divided signals from the frequency generator 2. The step output includes first and second step-down signals (AW, BW) associated with pulse-width increment of the PWM signals, and first and second step-down signals associated with pulse-width decrement of the PWM signals. Each of the first and second step-down signals (AW, BW) and the first and second step-up signals (CW, DW) has a pulse component within each PWM cycle.

In this embodiment, since the frequency of the PWM signals is 128 HZ, a counting value (p) of a 9-bit code corresponding to the first set of frequency-divided signals changes from 0 to ($2^9-1$) within each PWM cycle, where $G=2^9$, and g represents a counting value of a 9-bit code corresponding to the second set of frequency-divided signals, where $0 \leq g \leq (G-1)$. Therefore, when the counting value (p) reaches g, the pulse component of the first step-down signal (AW) occurs. When the counting value (p) reaches (g−G/2) mod G, the pulse component of the second step-down signal (BW) occurs. Therefore, the time difference between the pulse components of the first and second step-down signals (AW, BW) within the same PWM cycle is half the PWM cycle. On the other hand, when the counting value (p) reaches [(G−1)+G/2−g] mod G, the pulse component of the first step-up signal (CW) occurs. When the counting value (p) reaches [(G−1)−g] mod G, the pulse component of the second step-up signal (DW) occurs. Therefore, the time difference between the pulse components of the first and second step-up signals (CW, DW) within the same PWM cycle is half the PWM cycle. For example, during the counting value (g) being 510 (=2'b111111110), the pulse component of the first step-down signal (AW) occurs when the counting value (P) reaches 510 (=2'b111111110), the pulse component of the second step-down signal (BW) occurs when the counting value (P) reaches 254(=2'b011111110), the pulse component of the first step-up signal (CW) occurs when the counting value (P) reaches 257(=2'b100000001), and the pulse component of the second step-up signal (DW) occurs when the counting value (P) reaches 1(=2'b000000001).

It is noted that, since the counting value (g) gradually increases with time, for each of the first and second step-down signal (AW, BW), the appearance time of the pulse component within each PWM cycle is later than the appearance time of the pulse component within a previous PWN cycle, and for each of the first and second step-up signals (CW, DW), the appearance time of the pulse component within each PWM cycle is earlier than the appearance time of the pulse component within a previous PWN cycle. Furthermore, when the second set of frequency-divided signals is held in response to the pause signal, the step generator 4 ceases generation of the step output, i.e., the first and second step-down signals (AW, BW) and the first and second step-up signals (CW, DW).

The RGB modulation circuit 5 is connected electrically to the state generator 3, the step generator 4, and is adapted to be connected electrically to the secondary light emitting unit 92 of the lighting device 9. The RGB modulation circuit 5 receives the state counting output from the state generator 3, and the step output from the step generator 4. The RGB modulation circuit 5 is operable to generate the PWM signals based on the state counting output and the step output received thereby. In this embodiment, the RGB modulation circuit 5 includes an encoding unit 51, a cycle adjusting unit 52, and a duty-cycle adjusting unit 53.

Figure 5:
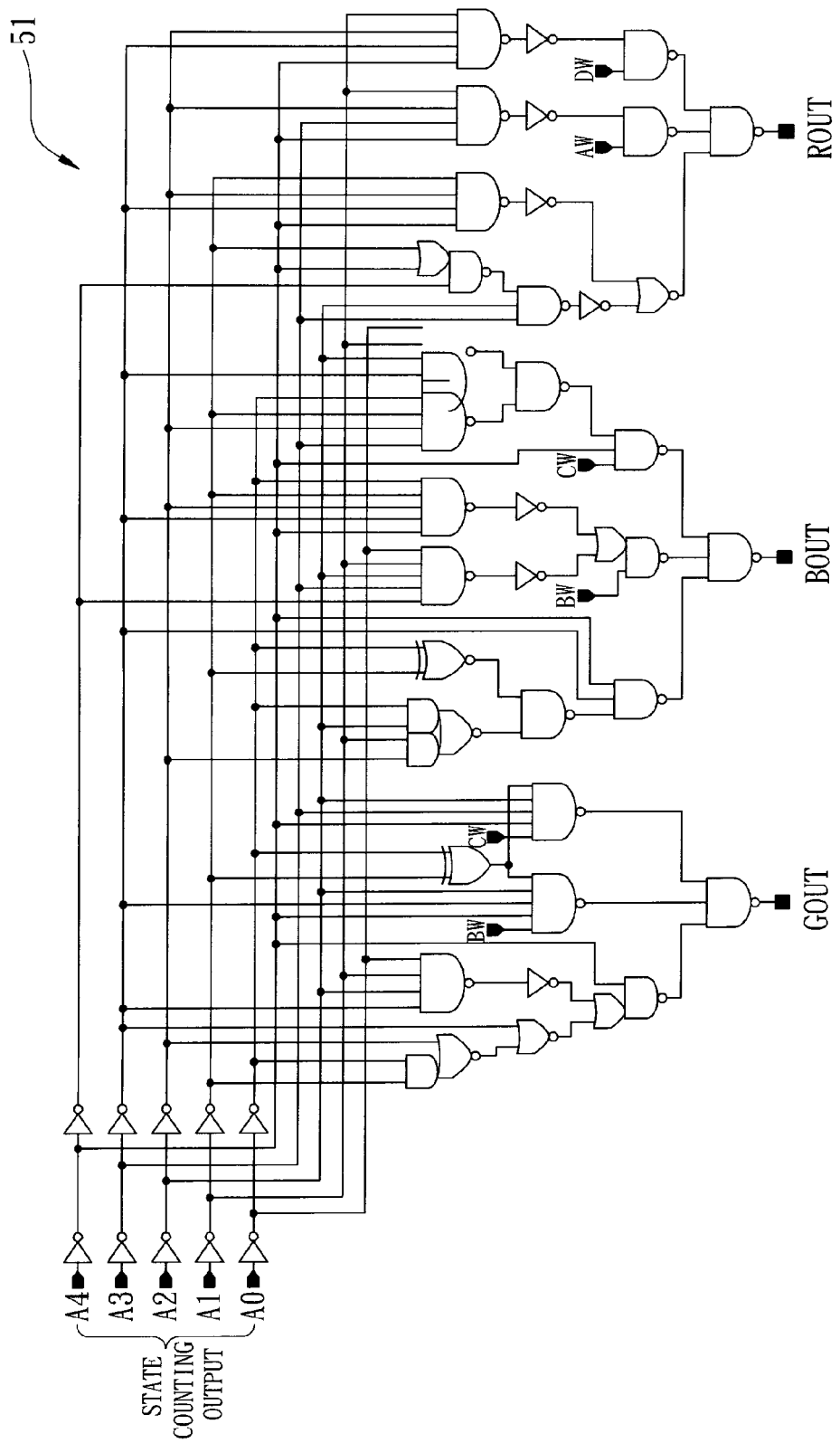
FIG. 5 is a schematic electrical circuit diagram illustrating an encoding unit of an RGB modulation circuit of the preferred embodiment.

Referring further to FIG. 5, the encoding unit 51 is connected electrically to the state generator 3 and the step generator 4 for receiving the state counting output and the step output therefrom. The encoding unit 51 is operable to encode the state counting output based on the step output into an encoding output. In this embodiment, the encoding output includes first, second and third encoding components (ROUT, GOUT, BOUT) that correspond to the PWM signals for driving the red, green and blue light LEDs 921, 922, 923, respectively. According to configuration of the encoding unit 51 show FIG. 5, the relationships between the state counting output and the encoding output can be obtained and are shown in the following Table 2:

TABLE 2

| state counting output A0A1A2A3A4 | ROUT | GOUT | BOUT |
|---|---|---|---|
| 00000 | 1 | 0 | 0 |
| 00001 | 1 | CW | 0 |
| 00010 | 1 | CW | 0 |
| 00011 | 1 | 1 | 0 |
| 00100 | AW | 1 | 0 |
| 00101 | AW | 1 | 0 |
| 00110 | 0 | 1 | 0 |
| 00111 | 0 | 1 | CW |
| 01000 | 0 | 1 | CW |
| 01001 | 0 | BW | 1 |
| 01010 | 0 | BW | 1 |
| 01011 | 0 | 0 | 1 |
| 01100 | DW | 0 | 1 |
| 01101 | DW | 0 | 1 |
| 01110 | 1 | 0 | 1 |
| 01111 | 1 | 0 | BW |
| 10000 | 1 | 0 | BW |
| 10001 | 1 | 0 | 0 |

Table 2 is related to Table 1. As such, any one of the first, second and third encoding components (ROUT, GOUT, BOUT) being equal to 1 represents the duty cycle of a corresponding PWM signal being 100%. Similarly, any one of the first, second and third encoding components (ROUT, GOUT, BOUT) being equal to 0 represents the duty cycle of a corresponding PWM signal being 0%.

Figure 6:
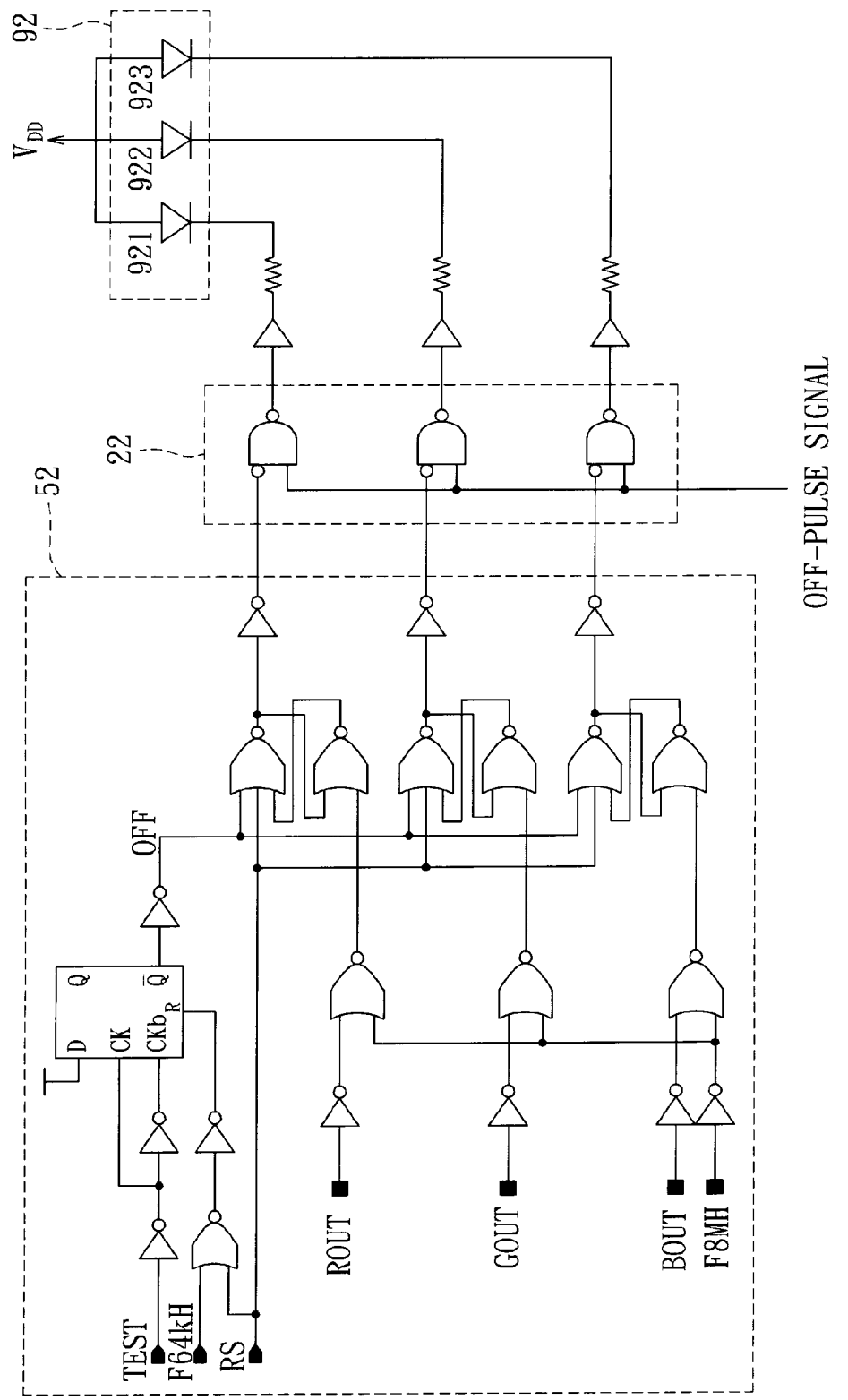
FIG. 6 is a schematic electrical circuit diagram illustrating a cycle adjusting unit and a duty-cycle adjusting unit of the RGB modulation circuit of the preferred embodiment.

Referring further to FIG. 6, the cycle adjusting unit 52 is connected electrically to the encoding unit 51 for receiving the encoding output therefrom. The cycle adjusting unit 52 is operable to generate the PWM signals based on the encoding output received thereby. According to configuration of the cycle adjusting unit 52 shown in FIG. 6, the cycle adjusting unit 52 is operable to enable each PWM signal to have the non-conduction level, i.e., the high level at the beginning of each PWM cycle, and determines whether each PWM signal switches from the non-conduction level to the conduction level, i.e., the low level, based on a corresponding one of the first, second and third encoding components (ROUT, GOUT, BOUT) of the encoding output from the encoding unit 51. In detail, the cycle adjusting unit 52 determines that each PWM signal switches from the non-conduction level to the conduction level upon detecting that the corresponding one of the first, second and third encoding elements (ROUT, GOUT, BOUT) is identical to one of the first and second step-down signals (AW, BW) and the first and second step-up signals (CW, DW).

Figures 8A, 8B, 8C:
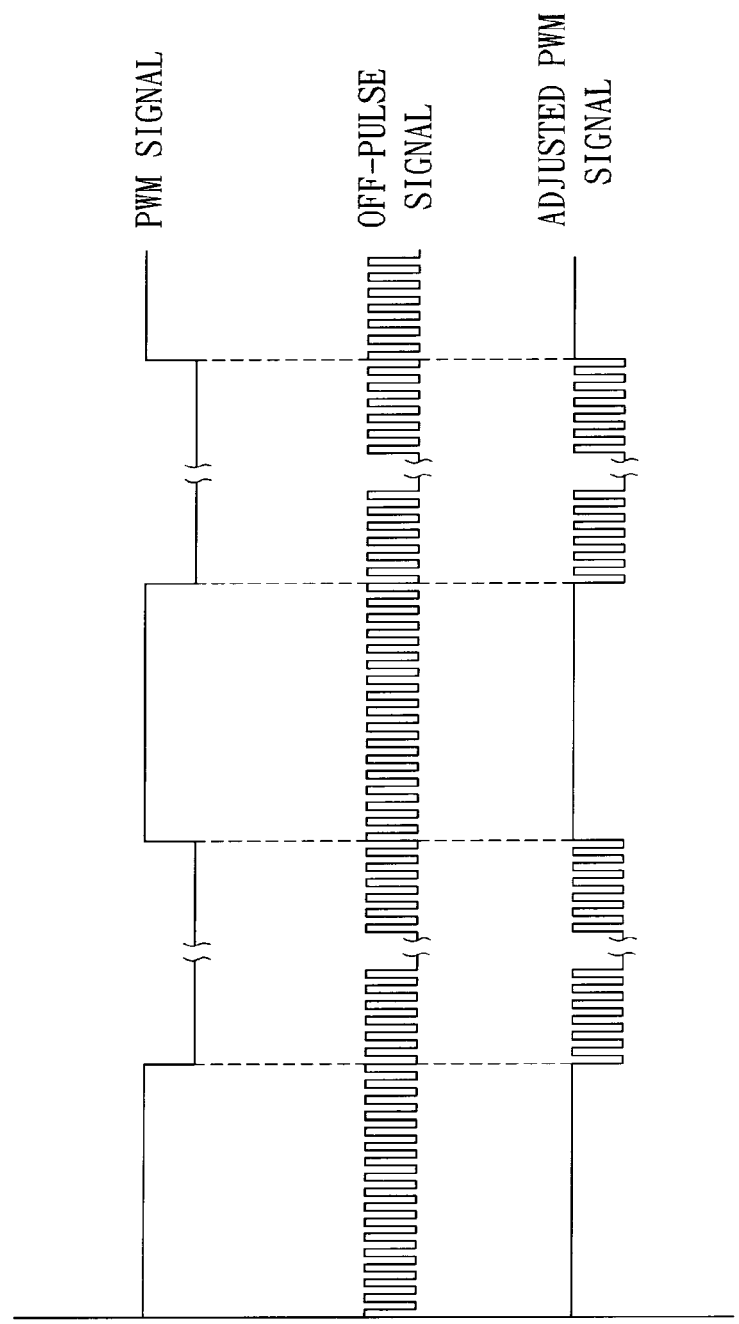
FIGS. 8a, 8b and 8c are timing diagrams of a PWM signal generated by the cycle adjusting unit, an OFF-pulse signal generated by the OFF-pulse generator and the PWN signal adjusted by the duty-cycle adjusting unit, respectively.

The duty-cycle adjusting unit 53 is connected electrically to the cycle adjusting unit 52, and receives the PWM signals from the cycle adjusting unit 52 and a periodic off-pulse signal. It is noted that the off-pulse signal has a frequency higher than that of the PWM signals, and a pulse width. The duty-cycle adjusting unit 53 is operable to adjust the duty cycle of each PWM signal at the conduction level, i.e., the low level, based on the off-pulse signal, and then outputs the PWM signals adjusted thereby to the cathodes of the red, green and blue LEDs 921, 922, 923 of the secondary light emitting unit 92, as shown in FIG. 6. For example, the PWM signal has the frequency of 128 Hz, as shown in FIG. 8a. The off-pulse signal has the frequency of 16 KHz, as shown in FIG. 8b. In this case, the PWM signal of FIG. 8a is adjusted by the duty-cycle adjusting unit 53 based on the off-pulse signal of FIG. 8b to obtain the adjusted PWM signal that has a reduced low-level period in each PWM cycle, as shown in FIG. 8c, thereby reducing the duty cycle of the PWM signal.

In addition, the larger the pulse width of the off pulse signal, the smaller will be the duty cycle of each PWM signal.

Figure 7:
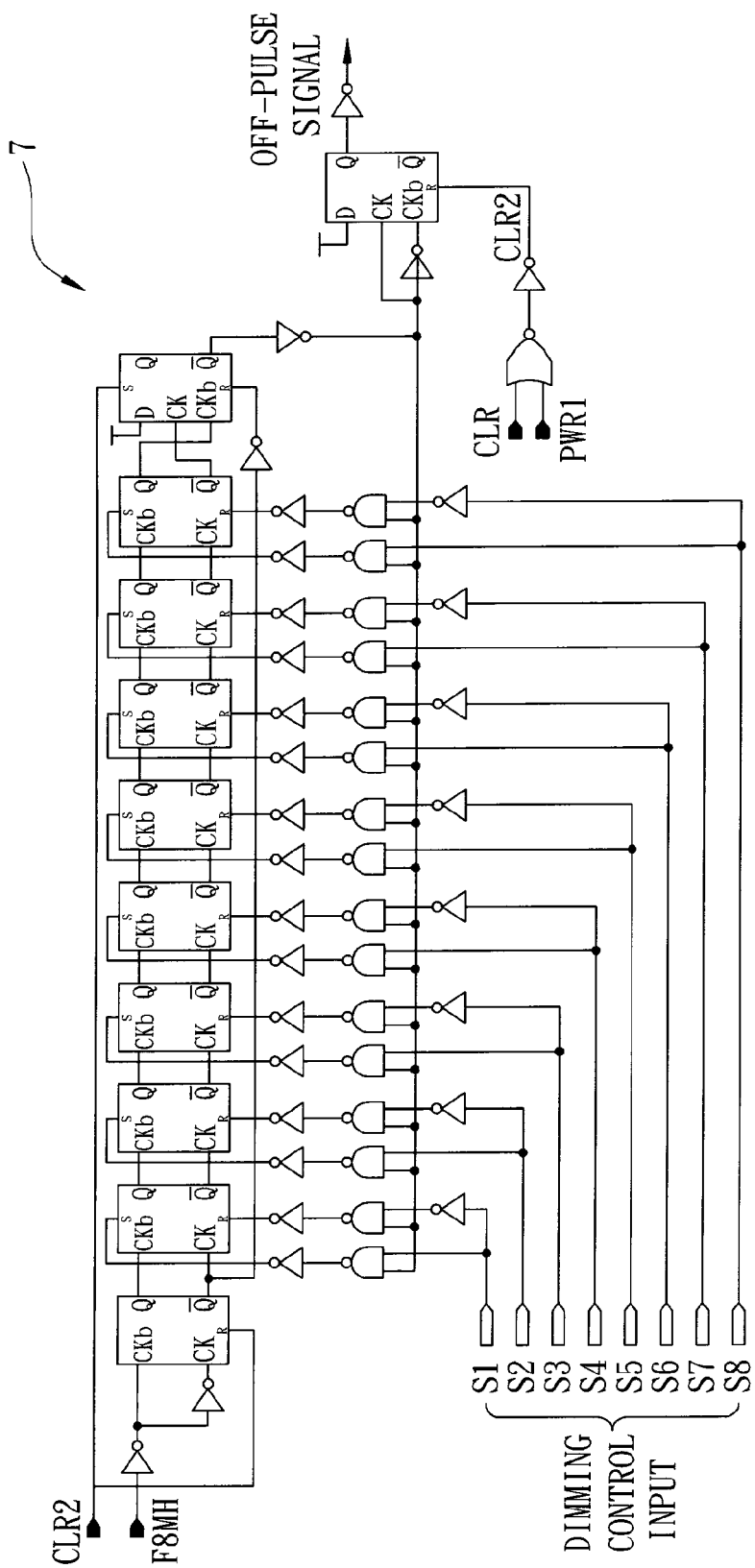
FIG. 7 is a schematic electrical circuit diagram illustrating an OFF-pulse generator 7 of the preferred embodiment.

The off-pulse signal generator 7 is connected electrically to the duty-cycle adjusting unit 53, and is operable to generate the periodic off-pulse signal based on an external dimming control input, and outputs the off-pulse signal to the duty-cycle adjusting unit 53. The pulse width of the off-pulse signal is determined by the dimming control input. The dimming control input consists of eight input signals (S1, S2, . . . , S8). In this embodiment, referring further to FIG. 7, the off-pulse signal generator 7 includes an 8-bit programmable counter. In is noted that the pulse width of the off-pulse signal is determined based on the dimming control input.

The input unit 6 is connected electrically to the frequency generator 2. The input unit 6 is operable to generate the pause signal, and outputs the pause signal to the frequency generator 2. Thus, the frequency generator 2 holds the second set of frequency-divided signals upon receipt of the pause signal such that the state generator 3 ceases to count to thereby unchange the counting value. As a result, the counting value of the state counting output generated by the state generator 3 is remained to a target one of the values such that the secondary light emitting unit 92 is remained in a desired one of the light-mixing states that corresponds to the counting value of the state counting output with the target one of the values through driving of the PWM signals generated by the dimming device.

In use, during activation of the main light emitting unit 91 through driving of the current generated by the constant current generator 1, the secondary light emitting unit 92 is periodically switched among the light-mixing states through driving of the PWM signals generated by the PWM signal generator such that light generated by the lighting device has various color temperatures and various color rendition indexes for each a period of 72 (=4×18) seconds. Then, once the input unit 6 is manually operated to generate the pause signal, the secondary light emitting unit 92 will be in a desired light-mixing state through driving the PWM signals such that light generated by the lighting device has desired color temperature and color rendition index. On the other hand, during deactivation of the main light emitting unit 91, the secondary light emitting unit 92 is driven by the PWM signals generated by the dimming device of the present invention to emit light with various colors corresponding respectively to the light-mixing states.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A dimming device for a lighting device including a main light emitting unit and a secondary light emitting unit, the secondary light emitting unit including at least one red-light-emitting element, at least one green-light-emitting element and at least one blue-light-emitting element, said dimming device comprising: a constant current generator adapted for outputting a current with a fixed amplitude to the main light emitting unit; a state generator operable to repeatedly count based on an input frequency signal so as to generate a state counting output having a counting value that is equal to one of a plurality of continuous values and that changes from a current one of the continuous values to a previous one of the continuous values after a time period associated with the input frequency signal, the values being respectively associated with a plurality of different light-mixing states of the secondary light emitting unit; and an RGB modulation circuit connected electrically to said state generator for receiving the state counting output therefrom, and operable to generate, based on the state counting output from said state generator, a plurality of periodic pulse width modulation (PWM) signals with the same PWM cycle, each of the PWM signals being adapted to drive a corresponding one of the red-light-emitting, green-light-emitting and blue-light-emitting elements of the secondary light emitting unit such that the secondary light-emitting unit is sequentially operated in the different light-mixing states; wherein the secondary light-emitting unit emits a mixed light with an individual color in each of the different light-mixing states to compensate lighting of the main light emitting unit.

2. The dimming device as claimed in claim 1, further comprising: a step generator connected electrically to said RGB modulation circuit for generating a step output that includes first and second step-down signals associated with pulse-width increment of the PWM signals, and first and second step-up signals associated with pulse-width decrement of the PWM signals, each of the first and second step-down signals and the first and second step-up signals having a pulse component within each PWM cycle; wherein said RGB modulation circuit includes an encoding unit connected electrically to said state generator and said step generator, receiving the state counting output from said state generator and the step output from said step generator, and operable to encode the state counting output based on the step output into an encoding output that includes a plurality of encoding components, and a cycle adjusting unit connected electrically to said encoding unit for receiving the encoding output therefrom, said cycle adjusting unit being operable to generate the PWM signals based on the encoding output received thereby.

3. The dimming device as claimed in claim 2, wherein: for each of the first and second step-down signals, the appearance time of the pulse component within each PWM cycle is later than the appearance time of the pulse component within a previous PWM cycle; and for each of the first and second step-up signals, the appearance time of the pulse within each PWM cycle is earlier than the appearance time of the pulse component within a previous PWM cycle.

4. The dimming device as claimed in claim 2, wherein said cycle adjusting unit is operable to enable each of the PWM signals to have a non-conduction level at the beginning of each PWM cycle, and determine whether each of the PWM signals switches from the non-conduction level to a conduction level based on a corresponding one of the encoding components of the encoding output from said encoding unit.

5. The dimming device as claimed in claim 4, wherein: the conduction level is lower than the non-conduction level; each of the red-light-emitting, green-light-emitting and blue-light-emitting elements of the secondary light emitting unit is deactivated to cease to emit light during the non-conduction level of a corresponding one of the PWM signals; and each of the red-light-emitting, green-light-emitting and blue-light-emitting elements of the secondary light emitting unit is activated to emit light during the conduction level of the corresponding one of the PWM signals.

6. The dimming device as claimed in claim 4, wherein said cycle adjusting unit determines that each of the PWM signals switches from the non-conduction level to the conduction level upon detecting that the corresponding one of the encoding components is identical to one of the first and second step-up signals and the first and second step-down signals.

7. The dimming device as claimed in claim 2, further comprising: an off-pulse generator connected electrically to said RGB modulation circuit, generating a periodic off-pulse signal based on an external dimming control input, and outputting the off-pulse signal to said RGB modulation circuit, the off-pulse signal having a frequency higher than that of the PWM signals, and a pulse width determined by the external dimming control input; wherein said RGB modulation circuit further includes a duty-cycle adjusting unit connected electrically to said cycle adjusting unit and said off-pulse generator, and receiving the PWM signals from said cycle adjusting unit and the off-pulse signal from said off-pulse generator, said duty-cycle adjusting unit being operable to adjust the duty cycle of each of the PWM signals at the conduction level based on the off-pulse signal, and outputting the PWM signals adjusted thereby to the secondary light emitting unit of the lighting device.

8. The dimming device as claimed in claim 1, further comprising an input unit operable to generate a pause signal such that the counting value of the state counting output generated by said state generator is remained to a target one of the values in response to the pause signal from said input unit and such that the secondary light emitting unit is remained in a desired one of the light-mixing states that corresponds to the counting value of the state counting output with the target one of the values through driving of the PWM signals generated by said RGB modulation circuit.

9. A dimming device for a light emitting unit, comprising: a pulse-width modulation (PWM) signal generator for generating a plurality of periodic pulse width modulation (PWM) singles with the same PWM cycle; and an off-pulse generator connected electrically to the PWM signal generator for generating a periodic off-pulse signal based on an external dimming control input, and outputting the off-pulse signal to said PWM signal generator, the off-pulse signal having a frequency higher than that of the PWM signals, and a pulse width determined by the external dimming control input; wherein said PWM signal generator further adjusts the duty cycle of each of the PWM signals based on the off-pulse signal from said off-pulse generator, and then outputs the PWM signals adjusted to the light emitting unit to drive the light emitting unit to emit light.

10. The dimming device as claimed in claim 9, the light emitting unit including at least one red-light-emitting element, at least one green-light-emitting element and at least one blue-light-emitting element, wherein said PWM signal generator includes: a state generator operable to repeatedly count based on an input frequency signal so as to generate a state counting output having a counting value that is equal to one of a plurality of continuous values and that changes from a current one of the continuous values to a previous one of the continuous values after a time period associated with the input frequency signal, the values being respectively associated with a plurality of different light-mixing states of the light emitting unit; and an RGB modulation circuit connected electrically to said state generator for receiving the state counting output therefrom, and operable to generate, based on the state counting output from said state generator, the PWM signals with the same PWM cycle, each of the PWM signals being adapted to drive a corresponding one of the red-light-emitting, green-light-emitting and blue-light-emitting elements of the light emitting unit such that the light-emitting unit is sequentially operated in the different light-mixing states; wherein the light-emitting unit emits a mixed light with an individual color in each of the different light-mixing states.

11. The dimming device as claimed in claim 10, wherein: said PWM signal generator further includes a step generator connected electrically to said RGB modulation circuit for generating a step output that includes first and second step-down signals associated with pulse-width increment of the PWM signals, and first and second step-up signals associated with pulse-width decrement of the PWM signals, each of the first and second step-down signals and the first and second step-up signals having a pulse component within each PWM cycle; and said RGB modulation circuit includes an encoding unit connected electrically to said state generator and said step generator, receiving the state counting output from said state generator and the step output from said step generator, and operable to encode the state counting output based on the step output into an encoding output that includes a plurality of encoding components, and a cycle adjusting unit connected electrically to said encoding unit for receiving the encoding output therefrom, said cycle adjusting unit generating the PWM signals based on the encoding output from said encoding unit.

12. The dimming device as claimed in claim 11, wherein: for each of the first and second step-down signals, the appearance time of the pulse component within each PWM cycle is later than the appearance time of the pulse component within a previous PWM cycle; and for each of the first and second step-up signals, the appearance time of the pulse within each PWM cycle is earlier than the appearance time of the pulse component within a previous PWM cycle.

13. The dimming device as claimed in claim 11, wherein said cycle adjusting unit is operable to enable each of the PWM signals to have a non-conduction level at the beginning of each PWM cycle, and determine whether each of the PWM signals switches from the non-conduction level to a conduction level based on a corresponding one of the encoding components of the encoding output from said encoding unit, each of the PWM signals having the non-conduction level during the OFF time period, and having the conduction level during the ON time period.

14. The dimming device as claimed in claim 13, wherein: the conduction level is lower than the non-conduction level; each of the red-light-emitting, green-light-emitting and blue-light-emitting elements of the secondary light emitting unit is deactivated to cease to emit light during the non-conduction level of a corresponding one of the PWM signals; and each of the red-light-emitting, green-light-emitting and blue-light-emitting elements of the secondary light emitting unit is activated to emit light during the conduction level of the corresponding one of the PWM signals.

15. The dimming device as claimed in claim 13, wherein said cycle adjusting unit determines that each of the PWM signals switches from the non-conduction level to the conduction level upon detecting that the corresponding one of the encoding components is identical to one of the first and second step-up signals and the first and second step-down signals.

16. The dimming device as claimed in claim 11, wherein said RGB modulation circuit further includes a duty-cycle adjusting unit connected electrically to said cycle adjusting unit and said off-pulse generator, and receiving the PWM signals from said cycle adjusting unit and the off-pulse signal from said off-pulse generator, said duty-cycle adjusting unit being operable to adjust the duty cycle of each of the PWM signals based on the off-pulse signal, and outputting the PWM signals adjusted thereby to the light emitting unit.

17. The dimming device as claimed in claim 10, further comprising an input unit connected electrically to said PWM signal generator, operable to generate a pause signal and outputting the pause signal to said PWM signal generator such that the counting value of the state counting output generated by said state generator is remained to a target one of the values in response to the pause signal from said input unit and such that the light emitting unit is remained in a desired one of the light-mixing states that corresponds to the counting value of the state counting output with the target one of the values through driving of the PWM signals generated by said RGB modulation circuit.

\* \* \* \* \*